(12) United States Patent
Burns et al.

(10) Patent No.: US 11,930,030 B1
(45) Date of Patent: *Mar. 12, 2024

(54) DETECTING AND RESPONDING TO MALICIOUS ACTS DIRECTED TOWARDS MACHINE LEARNING MODELS

(71) Applicant: HiddenLayer Inc., Leander, TX (US)

(72) Inventors: Tanner Burns, Austin, TX (US); Chris Sestito, Austin, TX (US); James Ballard, Fredericksburg, VA (US)

(73) Assignee: HiddenLayer Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,995

(22) Filed: Nov. 8, 2023

Related U.S. Application Data (63) Continuation of application No. 17/866,051, filed on Jul. 15, 2022.

(51) Int. Cl.
 *H04L 9/40* (2022.01)
 *H04L 41/16* (2022.01)
 *H04L 41/22* (2022.01)

(52) U.S. Cl.
 CPC .......... *H04L 63/1425* (2013.01); *H04L 41/16* (2013.01); *H04L 41/22* (2013.01)

(58) Field of Classification Search
 CPC ............................ H04L 63/1425; H04L 41/16
 USPC .......................................................... 726/22
 See application file for complete search history.

(56) References Cited

U.S. PATENT DOCUMENTS

| | | | | |
|---|---|---|---|---|
| 10,193,902 B1* | 1/2019 | Caspi | .................... | G06F 21/564 |
| 10,462,168 B2* | 10/2019 | Shibahara | ........... | G06F 16/2246 |
| 11,310,270 B1* | 4/2022 | Weber | ................. | H04L 63/1483 |
| 11,483,327 B2* | 10/2022 | Hen | ..................... | G06F 21/6218 |
| 11,710,067 B2* | 7/2023 | Harris | ................. | H04L 63/1433 |
| | | | | 706/12 |
| 11,762,998 B2* | 9/2023 | Kuta | ..................... | G06F 21/566 |
| | | | | 726/22 |
| 11,777,957 B2* | 10/2023 | Chen | .................. | H04L 63/1441 |
| | | | | 726/23 |

* cited by examiner

*Primary Examiner* — Badri Narayanan Champakesan
(74) *Attorney, Agent, or Firm* — Jones Day (57) ABSTRACT

A system detects and responds to malicious acts directed towards machine learning models. Data fed into and output by a machine learning model is collected by a sensor. The data fed into the model includes vectorization data, which is generated from raw data provided from a requester, such as for example a stream of timeseries data. The output data may include a prediction or other output generated by the machine learning model in response to receiving the vectorization data. The vectorization data and machine learning model output data are processed to determine whether the machine learning model is being subject to a malicious act (e.g., attack). The output of the processing may indicate an attack score. A response for handling the request by a requester may be selected based on the output that includes the attack score, and the response may be applied to the requestor.

20 Claims, 9 Drawing Sheets

DETECTING AND RESPONDING TO MALICIOUS ACTS DIRECTED TOWARDS MACHINE LEARNING MODELS

RELATED APPLICATION

The current application claims priority to U.S. patent application Ser. No. 17/866,051 filed on Jul. 15, 2022, the contents of which are hereby fully incorporated by reference.

BACKGROUND

Machine learning computing resources are becoming more popular in products and computing systems. With the increased presence of machine learning model resources, so have the attacks perpetrated on machine learning-based systems by bad actors. Traditional methods of virus detection do not detect attacks made against most machine learning systems. As such, what is needed is an improved method for detecting attacks on machine learning systems.

SUMMARY

The present technology, roughly described, detects and responds to malicious acts directed towards machine learning models. Data fed into and output by a machine learning model is collected by a sensor. The data fed into the model includes vectorization data, which is generated from raw data provided from a requester, such as for example a stream of timeseries data. The output data may include a prediction or other output generated by the machine learning model in response to receiving the vectorization data.

The vectorization data and machine learning model output data are processed to determine whether the machine learning model is being subject to a malicious act (e.g., attack). The output of the processing may indicate an attack score, for example in the form of a prediction whether the machine learning model is subject to malicious act. An alert may be generated based on the value of the attack score. A response for handling the request by a requester may be selected based on the output that includes the attack score, and the response may be applied to the requestor.

In some instances, the present technology provides a method for monitoring a machine learning-based system for malicious acts. The method begins by receiving vectorization data to the sensor. The vectorization data is derived from input data intended for a machine learning model and provided by a requestor. The sensor then receives an output generated by the machine learning model, wherein the machine learning model generates the output in response to receiving the vectorization data. Vectorization data and the model output are then processed by the processing engine to generate an attack score, the attack score indicating a likelihood of a malicious action towards the machine learning model via the vectorization data and model output. A response is applied to a request associated with the requestor, the response based at least in part on the attack score, the response applied in place of the output of the first machine learning model.

In some instances, a non-transitory computer readable storage medium includes embodied thereon a program, the program being executable by a processor to perform a method for monitoring a machine learning-based system for malicious acts. The method begins with receiving vectorization to the sensor. The vectorization data is derived from input data intended for a first machine learning model and provided by a requestor. The sensor then receives an output generated by the machine learning model, wherein the machine learning model generates the output in response to receiving the vectorization data. Vectorization data and model output are then processed by the processing engine to generate an attack score, the attack score indicating a likelihood of a malicious action towards the machine learning model via the vectorization data and the model output. A response is applied to a request associated with the requestor, the response based at least in part on the attack score, the response applied in place of the output of the first machine learning model.

In some instances, a system for monitoring a machine learning-based system for malicious acts includes a server having a memory and a processor. One or more modules can be stored in the memory and executed by the processor to receive vectorization data by a sensor, the vectorization data derived from input data intended for a first machine learning model and provided by a requestor, receive, by the processing engine, an output generated by the machine learning model, the machine learning model generating the output in response to receiving the vectorization data, process the vectorization data and the model output by the processing engine to generate an attack score, the attack score indicating a likelihood of a malicious action towards the machine learning model via the vectorization data, and apply a response to a request associated with the requestor, the response based at least in part on the attack score, the response applied in place of the output of the first machine learning model.

DETAILED DESCRIPTION

The present technology, roughly described, detects and responds to malicious acts directed towards machine learning models. Data fed into and output by a machine learning model is collected by a sensor. The data fed into the model includes vectorization data, which is generated from raw data provided from a requester, such as for example a stream of timeseries data. The output data may include a prediction or other output generated by the machine learning model in response to receiving the vectorization data. By receiving the vectorization data rather than the raw timeseries data, the privacy and context of the data is kept secret from the detection system that processes the vectorization data.

The vectorization data and machine learning model output data are processed to determine whether the machine learning model is being subject to malicious act, such as for example an attack. The processing may include feeding the vectorization data and output into one or more of several machine learning models, hash based filtering, and correlation of input and output of other requesters. The processing results in a determination as to whether the current data is associated with the malicious act, if a trend suggests the data is not as predicted, or if a distributed attack is or has occurred. The output of the processing may indicate an attack score, for example in the form of a prediction whether the machine learning model is subject to malicious act. An alert may be generated based on the value of the attack score.

A response for handling the request by a requester may be selected based on the output that includes the attack score, and a response may be generated and applied to the requestor. The response may be any of several responses, such as for example providing a false series of values, randomizing an output, implementing a honeypot response, or simply disconnecting the requester. The present system may also report status of the monitoring and malicious act detection trends of the machine learning model through one or more dashboards or interfaces.

Figure 1:
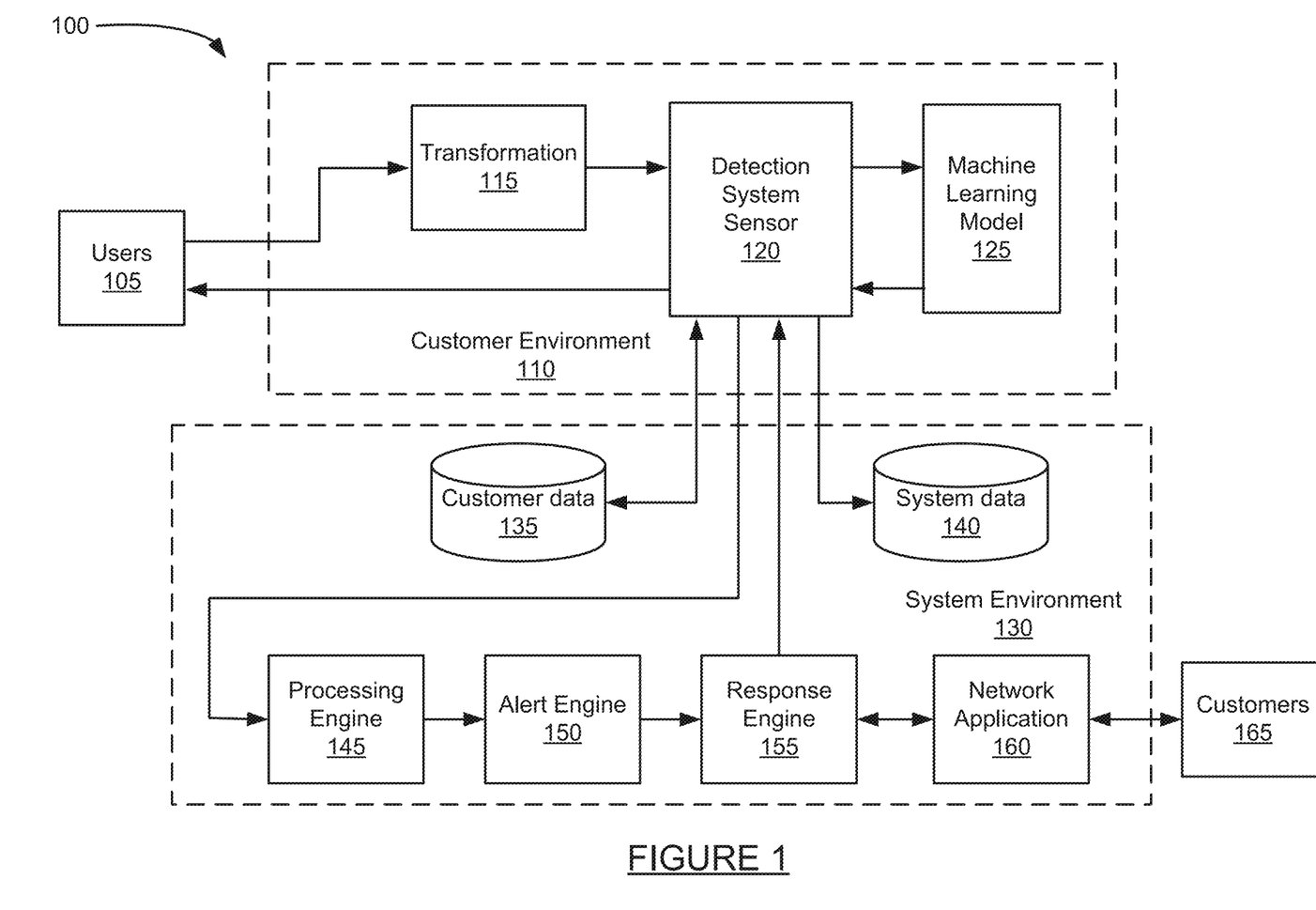
FIG. 1 is a block diagram of a system for detecting and responding to malicious acts directed towards a machine learning model.

FIG. 1 is a block diagram of a system for detecting and responding to malicious acts directed towards a machine learning model. The system of FIG. 1 includes users 105, customer environment 110, system environment 130, and customers 160. Customer environment includes a transformation module 115 and machine learning model 125. In between the transformation module and machine learning model is a detection system sensor 120.

One or more users may provide a stream of data, such as a timeseries data, generalized input, or some other data type, to transformation module 115. The transformation module may convert the received timeseries into a series of vectorized data. In some instances, the vectorized data may include an array of float numbers. The vectorization of the received data is then provided to machine learning model 125 for processing. After processing the vectorized data, machine learning model will provide an output, such as a prediction, intended for the requesting user 105.

Detection system sensor 120 may collect the vectorized data provided by transformation 115 and as well as the output provided by machine learning model 125. The sensor 120 may then couple the vectorized data and model output, and transmit the coupled data to the processing engine 145 of system environment 130. Sensor 120 may forward the vectorization data received from transformation 115 to machine learning model 125. Sensor 120 may also provide the output of model 125 or implement a different response to the requesting user. For example, sensor 120 may generate and transmit a response to the requesting user based on data received from response engine 155. In some instances, sensor 120 may disconnect the requesting user based on response data received from response engine 155.

The sensor may be implemented in several ways. In some instances, a sensor may be implemented as an API placed between the requesting user and the machine learning model. The API may intercept the request, and then send the request to the machine learning model as well as to a publisher API. The publisher API may then transmit the vectorization data to a processing engine. The sensor API may then receive the response generated by the customer's machine learning model, and forward the response to the requesting user, if no malicious act is detected, or generate a different response based on data received from the response engine 155.

In some instances, the sensor may be implemented by an API gateway as well as a proxy application. The API gateway may receive the request, provide the request to the proxy application, which may then forward the request to the machine learning model 125 as well as a publisher. The publisher may then forward the request to the system environment for processing by the processing engine 145. The machine learning model may provide a response to the proxy application, and the proxy application can also receive response data from response engine 155. The proxy application may then either forward the machine learning model response to the requesting user through the API gateway, if the user request is not associated with a malicious act, or may generate a response based on the response data received from the response engine 155 when the request is associated with the malicious act on the machine learning model.

In some instances, a vector traffic instance may be implemented to forward a received request to the machine learning model 125. A traffic mirror source may collect the traffic originating from the vector traffic instance and provide the traffic to a traffic mirror target, which then provides the traffic to a network load balancer. The network load balancer may then forward the vectorization traffic data through a series of traffic mirror worker applications, which then forward the vectorization traffic to processing engine 145. After processing the vectorization traffic, response engine 155 may provide response data to the traffic mirror workers, which then generate a response to transmit to the vector traffic instance when a malicious act on the machine learning model is detected.

Returning to FIG. 1, system environment 130 includes customer data store 135, system data store 140, processing engine 145, alert engine 150, response engine 155, network application 160, and customers 165. Each of customer environment 110 and system environment 130 may be implemented as one or more servers implementing the physical or logical modules 115-125 and 135-160 illustrated in FIG. 1. In some instances, each environment is located in one or more cloud computing environments.

Environments 110 and 130 may communicate over a network. In some instances, one or more modules may be implemented on separate machines in separate environments which may also communicate over a network. The network may be implemented by one or more networks suitable for communication between electronic devices, including but not limited to a local area network, wide-area networks, private networks, public network, wired network, a wireless network, a Wi-Fi network, an intranet, the Internet, a cellular network, a plain old telephone service, and any combination of these networks.

The customer data store 135 of FIG. 1 includes data associated with one or more customers. The customer data stored may be accessed by any module within system environment 130. More information for customer data 135 is discussed with respect to the system of FIG. 2.

System data 140 includes data related to system environment 130. System data may include event data, traffic data, timestamp data, and other data. The data may be accessed by any of modules 145-160, and may be used to generate one or more dashboards for use by customers 165. More details for system data store 140 are discussed with respect to FIG. 3.

Processing engine 145 may be implemented by one or more modules that receive and process coupled vectorization data and machine learning model output data. Processing the received coupled data may include applying one or more machine learning modeling techniques to the data to determine if a malicious act has been performed against the customer's machine learning model 125. The machine learning model techniques applied to the coupled data may include unsupervised learning or clustering, timeseries modeling, classification modeling, and other modeling techniques. After the coupled data has been processed, the processing engine generates an attack score and provides that score to alert engine 150. Alert engine 150 may generate an alert based on the value of the score. In some instances, different alerts may be provided based on the value of the score, with more urgent alerts generated for a higher score. Alert engine 150 then passes the coupled data and the attack score to response engine 155. Response engine 155 may receive the attack score, and optionally other data, and select a response to implement with respect to the requestor that transmitted the request from which the vectorization data was created. The responses may include anything such as providing a false series of prediction values having a pattern of some sort, providing a randomized response, implementing a honeypot response, or disconnecting the requester. Information about the selected response is provided to detection system sensor 120, which then generates and implements the response.

Response engine provides the selected response and the attack score to network application 160. Network application 160 may provide one or more APIs, integrations, or user interfaces, for example in the form of a dashboard, which may be accessed by customers 165. The dashboard may provide information regarding any detected or suspected malicious acts, attack trends, statistics and metrics, and other data. Examples of dashboards providing malicious act data is discussed with respect to FIGS. 7 and 8.

Figure 2:
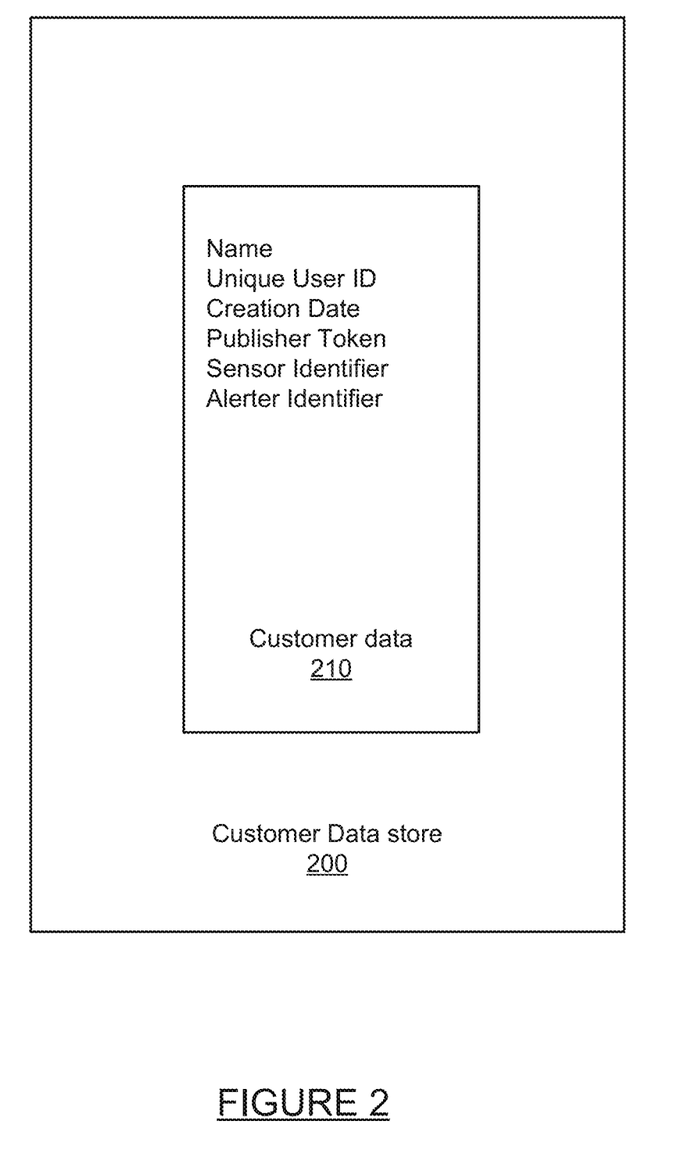
FIG. 2 is a block diagram of a customer data store.

FIG. 2 is a block diagram of a customer data store. Customer data store 200 of FIG. 2 provides more detail of customer data store 135 of FIG. 1. Customer data store may include customer data 210. The customer data 210 may include data associated with all customers that provide machine learning model 125. Customer data may include, but is not limited to, a customer name, a unique user ID, a date that the customer data was created, a publisher token, a sensor identifier, and a letter identifier. The sensor identifier may indicate what sensor is associated with the customer's machine learning model 125 that is being monitored by the present system. A letter identifier may include an identifier for a particular alert engine that provides alert regarding the particular user's machine learning model 125.

Figure 3:
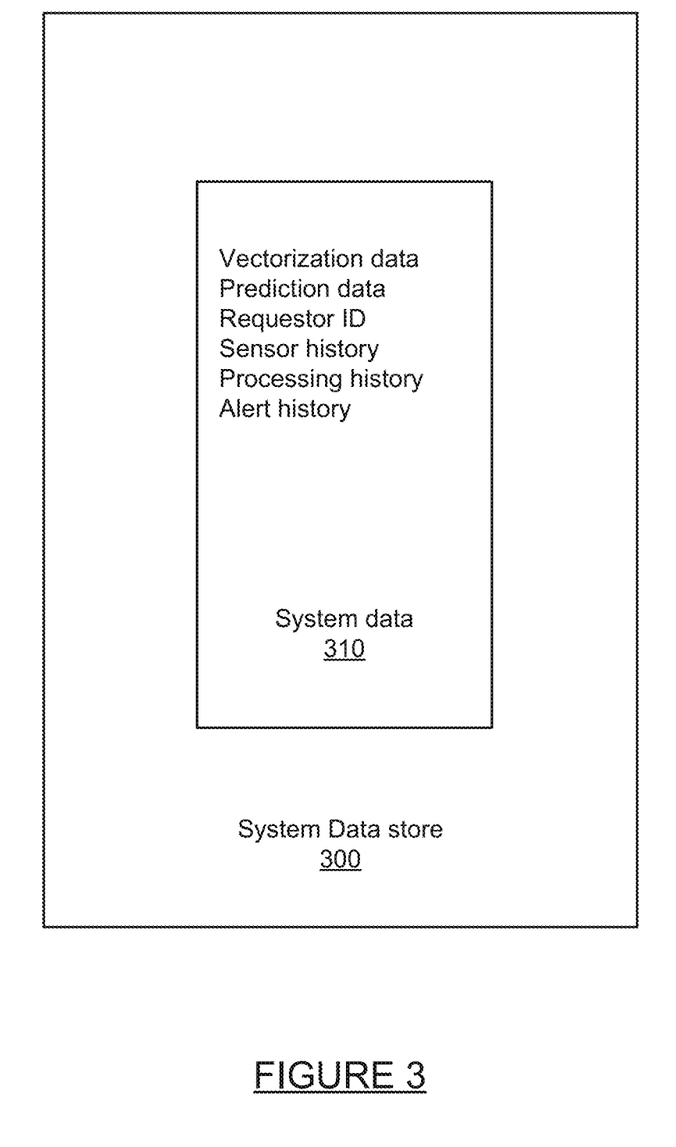
FIG. 3 is a block diagram of a system data store

FIG. 3 is a block diagram of a system data store. System data store 300 of FIG. 3 provides more detail for system data store 140 in the system of FIG. 1. System data store 300 include system data 310. The system data 310 may include, but is not limited to, vectorization data, prediction data, requester ID, sensor history, processing history, and alert history. The vectorization data may include the data generated by transformation module 115 with a customer environment 110, for each customer. Prediction data may include the output of machine learning model 125 that is intercepted by sensor 120, for each customer. Requester ID may include the source of raw data, such as timeseries data, which is provided from users 105 transformation 115. Sensor history includes a log of the actions performed by sensor 120, the platform on which sensors are implemented, and other data regarding each sensor. Processing history may include the history, such as log information, processing history, and other history for processing engine 145 for each particular customer. Alert history includes data such as the events occurring from alert engine 150, the status of alert engine 150, and the alerts generated by alert engine 150 for each particular customer.

Figure 4:
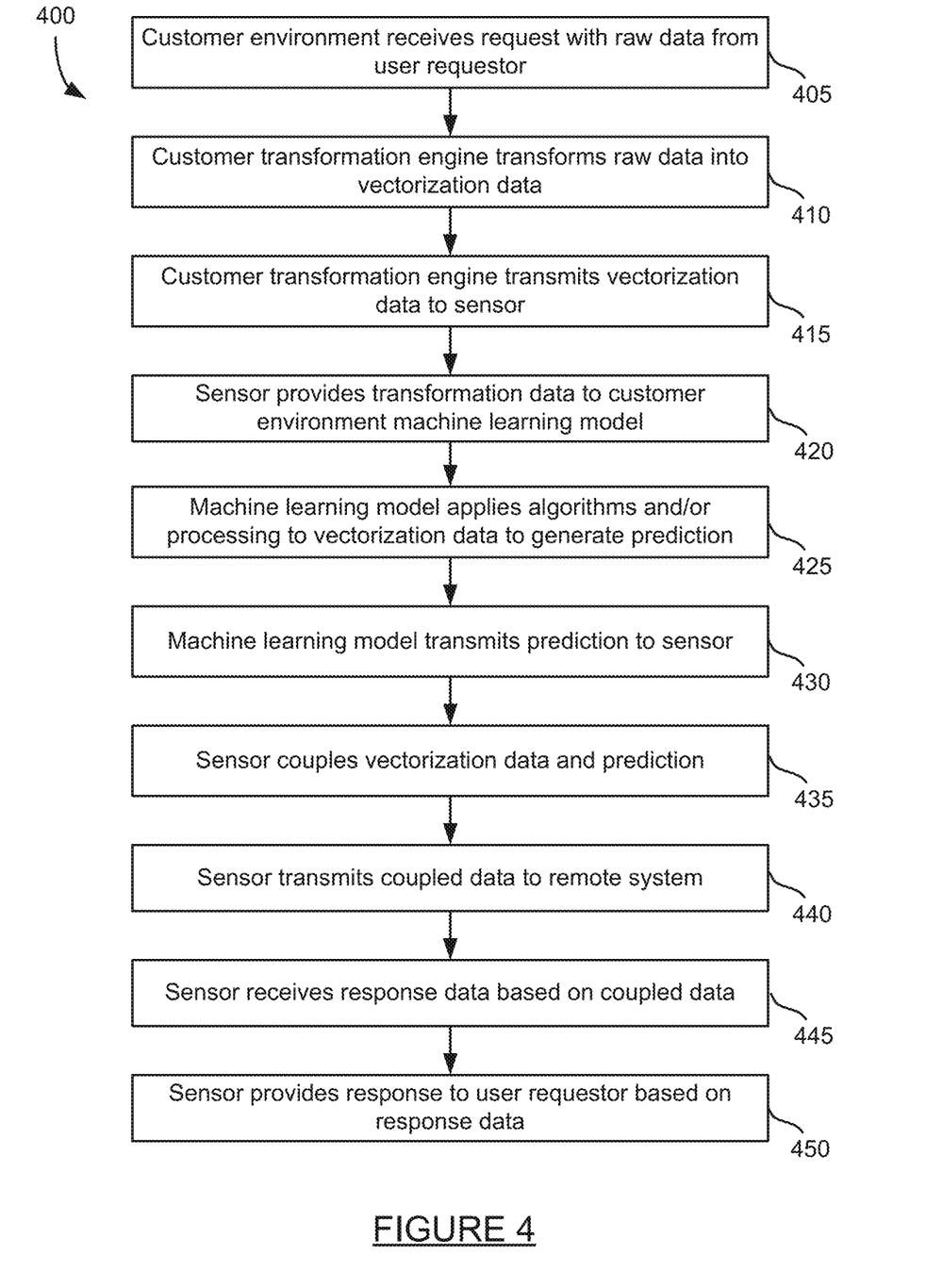
FIG. 4 is a method for intercepting vectorization data and a machine learning model prediction.

FIG. 4 is a method for intercepting vectorization data and a machine learning model prediction. First, a customer environment receives a request consisting of raw data from a user requester at step 405. The raw data may include a stream of timeseries data, or other data provided directly from a requester to the customer's environment. Customer transformation engine then transforms the raw data into vectorization data at step 410. The vectorization data will not have any context associated with the requester, but will still be associated with a requester ID. The vectorization data cannot be processed to determine the identity of the requester. In some instances, the vectorization data may be in the format of an array of float numbers.

The customer transformation engine transmits the vectorization data to a sensor at step 420. The sensor may be placed between the transformation module 115 and the machine learning model 125 to collect, or in some cases intercept, vectorization data transmitted to model 125.

The sensor may be provided in a variety of formats. In some instances, the sensor may be provided as an API to which vectorization data can be directed. In some instances, the sensor may be implemented as a network traffic capture tool that captures traffic intended for the machine learning model. In some instances, the sensor can be implemented using cloud libraries, for example a Python or C library, which can be plugged into customer software and used to direct vectorization traffic to the processing engine 145.

Machine learning model applies algorithms and/or processing to the vectorization data to generate a prediction at step 425. Machine learning model 125 is part of the customer's environment and processes the vectorization data that is transmitted by transformation module 115. In some instances, sensor 120, after collecting and/or intercepting the vectorization data, may forward the vectorization data to machine learning model 125 to be processed. Machine learning model then transmits the output prediction to sensor 120 at step 430.

The sensor couples the vectorization data and prediction at step 435. The sensor then transmits the coupled data to the remote system environment 130 at step 440. At some point subsequently, the sensor receives response data based on the coupled data at step 445. The response data may be an indication of what response to send the requester generated by the system 130. In particular, the response data may indicate a response selected by response engine 155, other than the prediction output, to be provided to the requester based on a detection of a malicious act by the requester. The sensor generates a response based on the response data to the user requester at step 450. The response may be a pattern of data other than the output generated by machine learning model 125, randomized data, a honeypot based response, or a termination or disconnect of the session with the requester.

Figure 5:
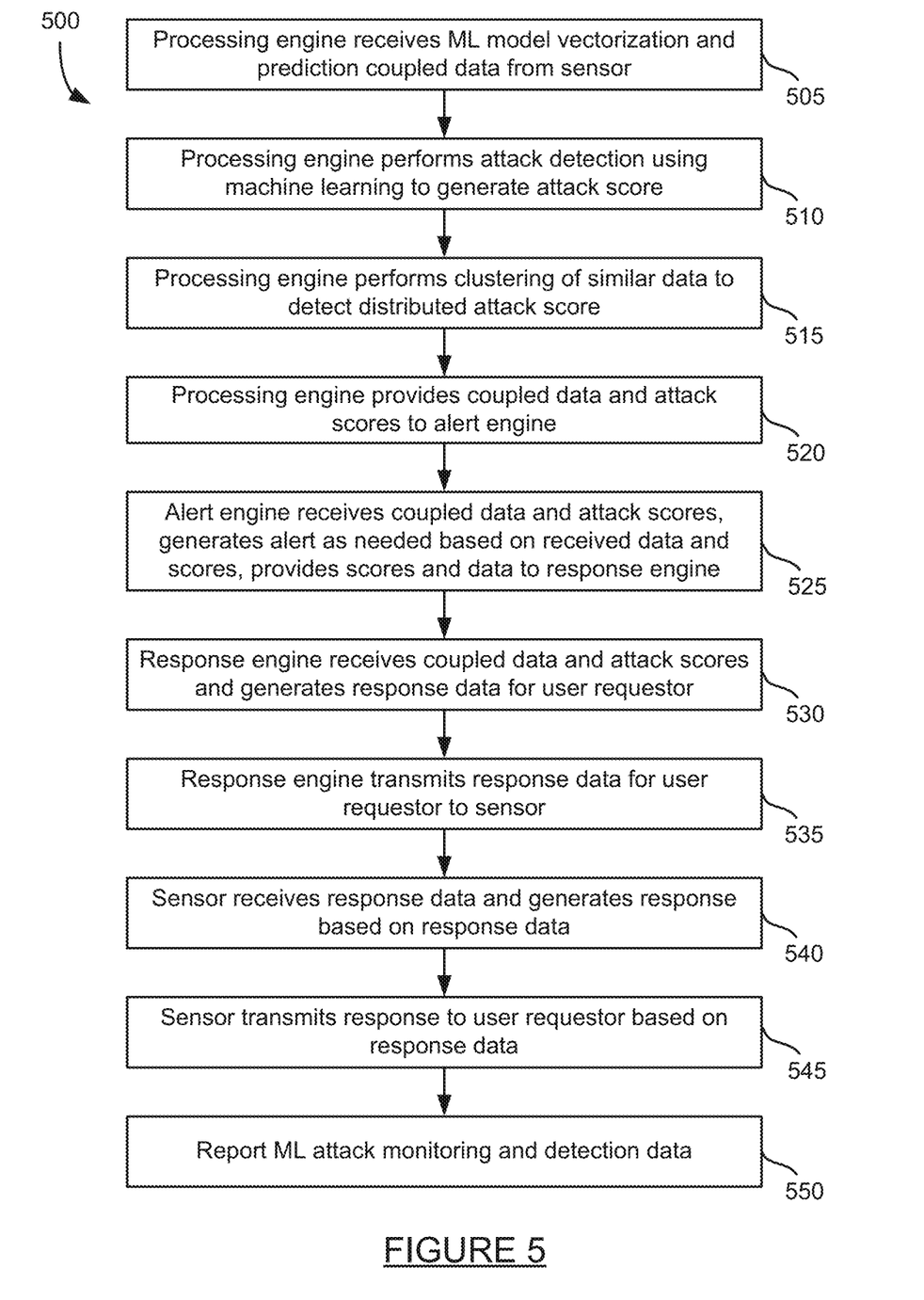
FIG. 5 is a method for detecting and responding to malicious acts directed towards a machine learning model.

FIG. 5 is a method for detecting and responding to malicious acts directed towards a machine learning model. First, a processing engine receives the machine learning model vectorization and prediction coupled data from the sensor at step 505. Processing engine then analyzes the received data using one or more machine learning techniques to generate an attack score at step 510. Performing machine learning to analyze the data may include performing unsupervised learning or clustering on the received data, timeseries modeling, classification modeling, or some other machine learning based analysis and/or modeling on the coupled data. In some instances, analyzing the data includes performing clustering on similar data to determine if there is a distributed attack underway on the machine learning model at step 515. As a result of analyzing the coupled data, the processing engine generates an attack score. The attack score may be an indicator as to the likelihood or a predictor of whether the machine learning model 125 provided by the customer is currently under attack or will be under attack in the near future.

After determining the attack score, the processing engine provides the coupled data and the attack score to an alert engine at step 520. In some instances, the alert engine 150 of FIG. 1 may have several instances, with one instance per customer. The alert engine receives a coupled data and attack scores, generates alert as needed based on the received data and the scores, and provides the scores and data to a response engine at step 525. The alert engine may generate a different alert based on the value of the received data. More details for an alert engine generating an alert is discussed with respect to the method of FIG. 6.

A response engine receives the coupled data and the attack score and generates response data for the user requester at step 530. The response data may include a selected response to apply to the requester if the attack score is over a certain threshold. For example, if the attack scores over 50%, then a response other than the output generated by machine learning model 125 may be provided to the requester that provided the raw data to transformation 115. The selected response may be based on user request, the category of the malicious act, the time or date of the response, the history of attacks from the particular requestor, and other data. The response engine transmits the response data for the user requester to the sensor at step 535. The sensor receives the response data and generates a response based on the response data at step 540. The sensor executes the response, in some cases transmitting a response to the user requester, based on the received response data at step 545. The status of any attack on the machine learning model owned by the customer can be reported at step 550. The reporting may include details, including raw data, metrics, current status, regarding the monitoring and detection data for sharing learning model 125. More details regarding dashboards that provide reporting data to a customer are discussed with respect to FIGS. 7 and 8.

Figure 6:
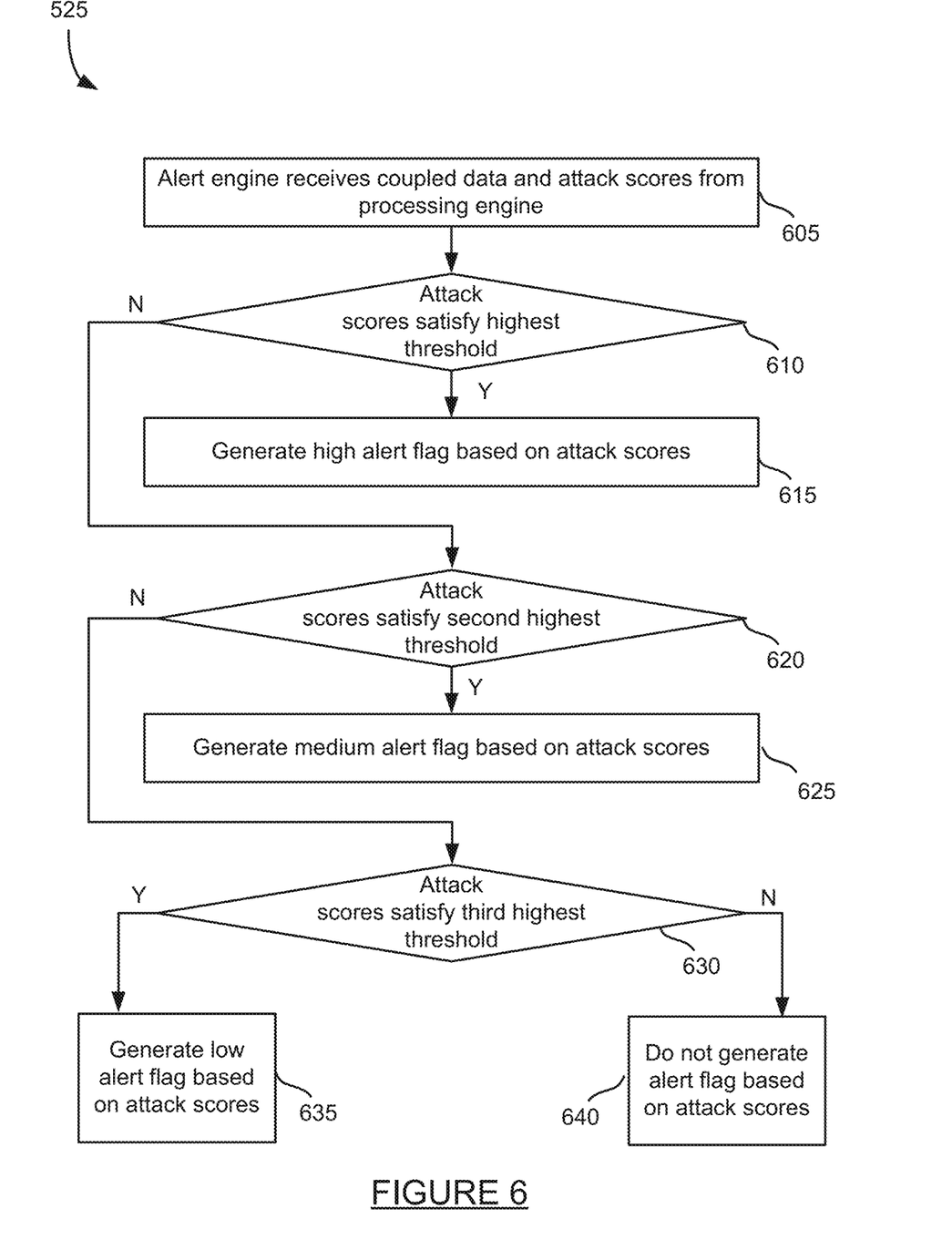
FIG. 6 is a method for generating an alert.

FIG. 6 is a method for generating an alert. The method of FIG. 6 provides more detail for step 525 of the method of FIG. 5. Alert engine 150 receives coupled data and attack scores from processing engine 145 at step 605. A determination is made as to whether the attack score satisfies a highest threshold at step 610. The highest threshold may indicate whether the highest level of alert should be generated for the particular vectorization data and output coupled pair. In some instances, an attack score of 90% or higher would satisfy the highest threshold. If the attack score does not satisfy the highest threshold, the method of FIG. 6 continues to step 620. If the attack scores to satisfy the highest threshold, a hilar flag is generated based on the attack scores, and the other data is stored in system data 140.

A determination is made as to whether the attack score satisfies the second highest threshold at step 620. In some instances, a second highest threshold may be between 80% to 90%. If the attack scores to satisfy the second highest threshold, a medium alert flag may be generated at step 625 based on the attack scores, and the medium alert flag may be stored in system data store 140.

A determination is made as to whether the attack score satisfies a third highest threshold at step 630. If the attack score does satisfy the third highest threshold, a low alert flag is generated based on the attack scores, and the alert is stored in system data store 140. If the attack score does not satisfy the third highest threshold, no alert flag is generated for the attack score. In this case, detection system sensor 120 may provide the generated output of the machine learning model 125 to the requester that provided the original request.

Figure 7:
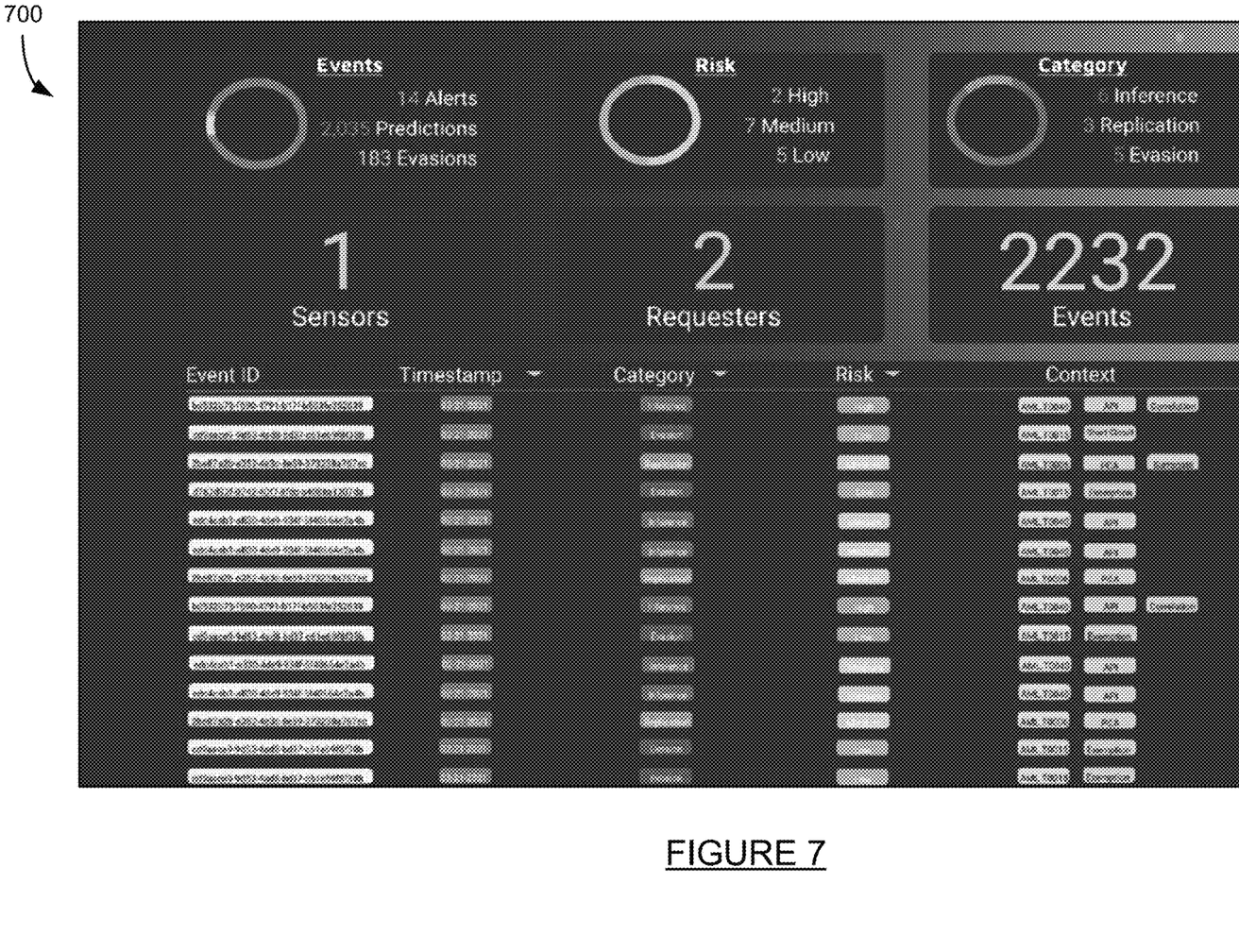
FIG. 7 is an interface for reporting the status of detected malicious acts directed towards a machine learning model.

FIG. 7 is an interface for reporting the status of detected malicious acts directed towards a machine learning model. The interface of FIG. 7 includes windows for reporting events, risk, category, sensors, requesters, events, and event details. The events window may indicate the number of events, the number of predictions, and the number of evasions recorded by the present system. The risk window can report the number of high risks, medium risks, and low risks. The high, medium, and low levels may be associated with the alert levels provided by alert engine 150. The category window may report categories of attacks on a customer's machine learning model. In the interface 700 the categories include inference categories, replication categories, and division categories. The sensors window indicates the number of sensors dedicated to a user's machine learning model, and the number of requesters that have been requesting usage of the machine learning model. The events window indicates the total number of events that occurred with respect to the machine learning model of the customer.

The event details window indicates an event identifier, timestamp, category of attack, risk level, and context for each particular event. The event details may be scrolled and searched within interface 700.

Figure 8:
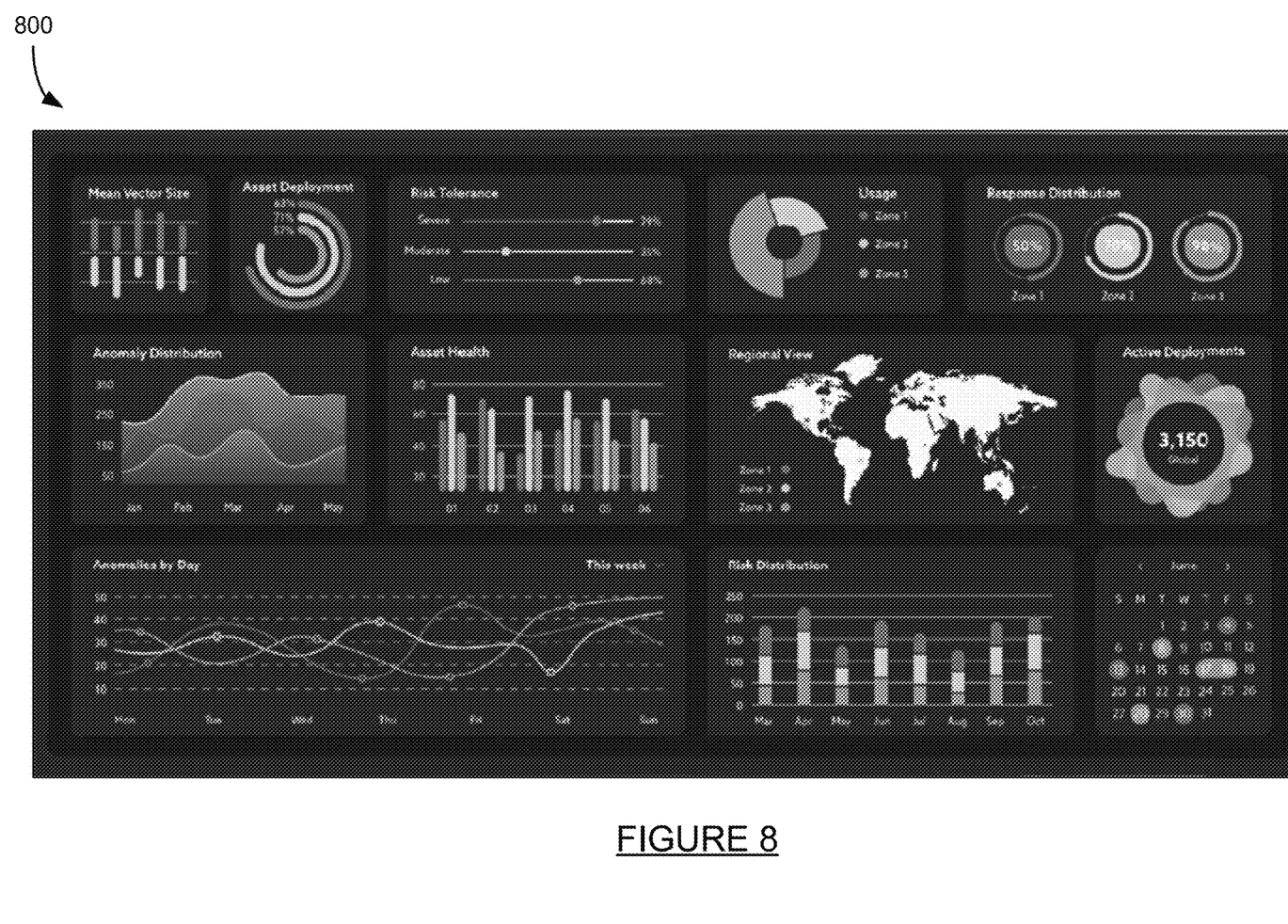
FIG. 8 is another interface for reporting the status of detected malicious acts directed towards a machine learning model.

FIG. 8 is another interface for reporting the status of detected malicious acts directed towards a machine learning model. Interface 800 of FIG. 8 provides additional data regarding the monitoring and threat detection associated with machine learning model 125. In particular, the interface 800 of FIG. 8 may provide data in graphical format related to a mean vector score, asset deployment, risk tolerance, and geographical information regarding the core of the requesters using the machine learning model 125. The geographical information may be split into zones, and the data provided may include zone usage, response distribution for zone, and a regional view of the zones. Interface 800 may also graphically display an anomaly distribution, asset health, number of active deployments, and anomalies by day, week, or month. Additionally, interface 800 may illustrate risk distribution in different formats, such as a bar view or calendar view.

The interfaces of FIGS. 7 and 8 are exemplary, and are not intended to be limiting. The data collected, monitored, and the actions taken may be reported as raw data, metrics may be generated from the data, and trends may be determined from the data, all of which may be reported through one or more interfaces or dashboards.

Figure 9:
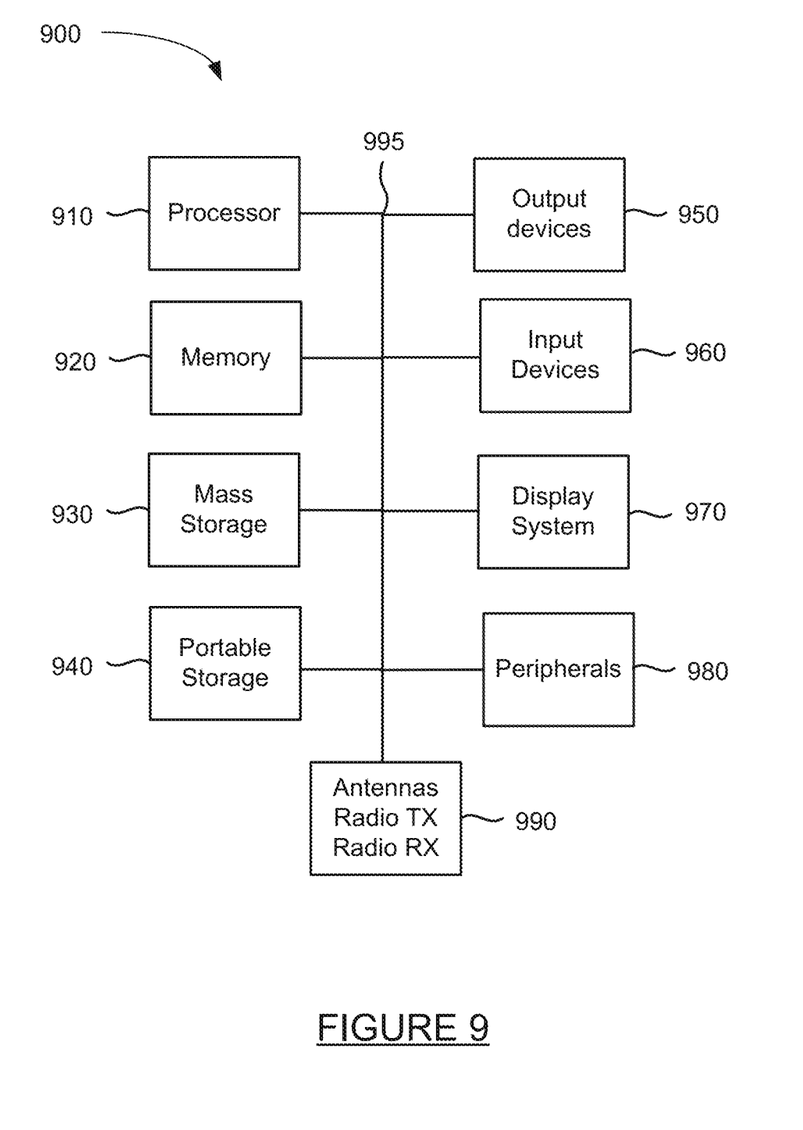
FIG. 9 provides a computing environment for implementing the present technology.

FIG. 9 is a block diagram of a computing environment for implementing the present technology. System 900 of FIG. 9 may be implemented in the contexts of the likes of machines that implement detection system sensory 120, data stores 135 and 140, processing engine 145, alert engine 150, response engine 155, and network application 160. The computing system 900 of FIG. 9 includes one or more processors 910 and memory 920. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive, an optical disk drive, a flash drive, or other device, is a non-volatile storage device for storing data and instructions for use by processor unit 910. Mass storage device 930 can store the system software for implementing embodiments of the present invention for purposes of loading that software into main memory 920.

Portable storage device 940 operates in conjunction with a portable non-volatile storage medium, such as a floppy disk, compact disk or Digital video disc, USB drive, memory card or stick, or other portable or removable memory, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 900 as shown in FIG. 9 includes output devices 950. Examples of suitable output devices include speakers, printers, network interfaces, and monitors.

Display system 970 may include a liquid crystal display (LCD) or other suitable display device. Display system 970 receives textual and graphical information and processes the information for output to the display device. Display system 970 may also receive input as a touch-screen.

Peripherals 980 may include any type of computer support device to add additional functionality to the computer system. For example, peripheral device(s) 980 may include a modem or a router, printer, and other device.

The system of 900 may also include, in some implementations, antennas, radio transmitters and radio receivers 990. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

The invention claimed is:

1. A method for monitoring a machine learning-based system for malicious acts comprising:
   receiving vectorization data by a sensor being executed on a server, the vectorization data derived from input data intended for a first machine learning model and provided by a requestor;
   receiving, by the sensor, an output generated by the machine learning model, the machine learning model generating the output in response to receiving the vectorization data;
   transmitting vectorization data and the output to a processing engine by the sensor;
   processing the vectorization data and the output by the processing engine to generate an attack score, the attack score indicating a likelihood of a malicious action towards the machine learning model via the vectorization data; and
   applying a response to a request associated with the requestor, the response based at least in part on the attack score, the response applied in place of the output of the first machine learning model, the applying of the response including:
      selecting, by a response engine, a response based on an output by a second machine learning model within the processing engine, the output of the second machine learning model including a prediction of an attack on the first machine learning model; and
      causing the output of the first machine learning model to be modified or causing the requestor to be disconnected.

2. The method of claim 1, further comprising collecting the vectorization data by a sensor component, the sensor component transmitting the collected vectorization data to the processing engine on the server.

3. The method of claim 2, wherein the sensor component is created in a computing environment that proxies the first machine learning model.

4. The method of claim 2, further including:
   collecting the output generated by the first machine learning model by the sensor component;
   coupling the vectorization data and output by the sensor component; and
   transmitting the coupled vectorization data and output to the processing engine by the sensor component.

5. The method of claim 2, further including:
   intercepting the output of the first machine learning model by a sensor component; and
   transmitting a response generated by the sensor to the requestor in place of the output, the response generated based at least in part on the attack score.

6. The method of claim 1, further comprising generating an alert based on the attack score.

7. The method of claim 1, further comprising reporting attack data to a user through a graphical interface, the attack data based at least in part on the attack score.

8. A non-transitory computer readable storage medium having embodied thereon a program, the program being executable by a processor to perform operations for monitoring a machine learning-based system for malicious acts, the operations comprising:
- receiving vectorization data by a sensor, the vectorization data derived from input data intended for a first machine learning model and provided by a requestor;
- receiving, by the sensor, an output generated by the machine learning model, the machine learning model generating the output in response to receiving the vectorization data;
- transmitting the vectorization data and the output to a processing engine by the sensor;
- processing the vectorization data and the output by the processing engine to generate an attack score, the attack score indicating a likelihood of a malicious action towards the machine learning model via the vectorization data; and
- applying a response to a request associated with the requestor, the response based at least in part on the attack score, the response applied in place of the output of the first machine learning model, the applying of the response including:
  - selecting, by a response engine, a response based on an output by a second machine learning model within the processing engine, the output of the second machine learning model including a prediction of an attack on the first machine learning model; and
  - causing the output of the first machine learning model to be modified or causing the requestor to be disconnected.

9. The non-transitory computer readable storage medium of claim 8, wherein the operations further comprise: collecting the vectorization data by a sensor component, the sensor component transmitting the collected vectorization data to the processing engine.

10. The non-transitory computer readable storage medium of claim 9, wherein the sensor component is created in a computing environment that implements the first machine learning model.

11. The non-transitory computer readable storage medium of claim 9, wherein the operations further comprise:
- collecting the output generated by the first machine learning model by the sensor component;
- coupling the vectorization data and output by the sensor component; and
- transmitting the coupled vectorization data and output to the processing engine by the sensor component.

12. The non-transitory computer readable storage medium of claim 9, wherein the operations further comprise:
- intercepting the output of the first machine learning model by a sensor component; and
- transmitting a response generated by the sensor to the requestor in place of the output, the response generated based at least in part on the attack score.

13. The non-transitory computer readable storage medium of claim 8, wherein the operations further comprise: generating an alert based on the attack score.

14. The non-transitory computer readable storage medium of claim 8, wherein the operations further comprise: reporting attack data to a user through a graphical interface, the attack data based at least in part on the attack score.

15. A system for monitoring a machine learning-based system for malicious acts, comprising:
- at least one data processor; and
- memory for storing instructions which, when executed by the at least one data processor, result in operations comprising:
  - receiving vectorization data derived from input data intended for a first machine learning model and provided by a requestor;
  - receiving an output generated by the machine learning model, the machine learning model generating the output in response to receiving the vectorization data;
  - transmitting vectorization data and the output to a processing engine;
  - processing the vectorization data and the output by the processing engine to generate an attack score, the attack score indicating a likelihood of a malicious action towards the machine learning model via the vectorization data; and
  - causing a response to a request associated with the requestor to be applied, the response based at least in part on the attack score, the response applied in place of the output of the first machine learning model, the causing including:
    - selecting, by a response engine, a response based on an output by a second machine learning model within the processing engine, the output of the second machine learning model including a prediction of an attack on the first machine learning model; and
    - causing the output of the first machine learning model to be modified or causing the requestor to be disconnected.

16. The system of claim 15, wherein the operations further comprise: collecting the vectorization data by a sensor component, the sensor component transmitting the collected vectorization data to the processing engine.

17. The system of claim 16, wherein the sensor component is created in a computing environment that implements the first machine learning model.

18. The system of claim 16, wherein the operations further comprise:
- collecting the output generated by the first machine learning model by the sensor component;
- coupling the vectorization data and output by the sensor component; and
- transmitting the coupled vectorization data and output to the processing engine by the sensor component.

19. The system of claim 15, wherein the operations further comprise:
- intercepting the output of the first machine learning model by a sensor component; and
- transmitting a response generated by the sensor to the requestor in place of the output, the response generated based at least in part on the attack score.

20. The system of claim 15, wherein the operations further comprise:
- generating an alert based on the attack score.

* * * * *